(12) United States Patent
Parulski

(10) Patent No.: US 8,780,180 B2
(45) Date of Patent: Jul. 15, 2014

(54) STEREOSCOPIC CAMERA USING ANAGLYPHIC DISPLAY DURING CAPTURE

(75) Inventor: Kenneth Alan Parulski, Rochester, NY (US)

(73) Assignee: Apple Inc., Cupertino, CA (US)

( * ) Notice: Subject to any disclaimer, the term of this patent is extended or adjusted under 35 U.S.C. 154(b) by 418 days.

(21) Appl. No.: 13/106,952

(22) Filed: May 13, 2011

(65) Prior Publication Data

US 2012/0287243 A1  Nov. 15, 2012

(51) Int. Cl.
*H04N 13/00* (2006.01)

(52) U.S. Cl.
CPC .................................... *H04N 13/00* (2013.01)
USPC .................................... 348/46; 348/E13.074

(58) Field of Classification Search
CPC .............. H04N 13/00; H04N 5/23293; H04N 13/0221; H04N 13/0282; H04N 13/0404; H04N 13/044; H04N 13/0445; H04N 13/0285; H04N 13/0447
USPC ............................................ 348/46, E13.074
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daley et al. | |
| 5,189,511 A | 2/1993 | Parulski et al. | |
| 5,325,193 A | 6/1994 | Pritchard et al. | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 5,883,695 A | 3/1999 | Paul | |
| 6,192,162 B1 | 2/2001 | Hamilton, Jr. et al. | |
| 6,292,218 B1 | 9/2001 | Parulski et al. | |
| 6,934,056 B2 | 8/2005 | Gindele et al. | |
| 7,466,336 B2 | 12/2008 | Regan et al. | |
| 7,542,077 B2 | 6/2009 | Miki | |
| 2004/0046885 A1* | 3/2004 | Regan et al. | 348/333.11 |
| 2007/0024931 A1 | 2/2007 | Compton et al. | |
| 2011/0273437 A1* | 11/2011 | Sanderson et al. | 345/419 |
| 2011/0304693 A1* | 12/2011 | Border et al. | 348/46 |

OTHER PUBLICATIONS

"Anaglyph 3D Camera iPhone photography application by Nigel Crawley," http://www.mymappin.com/apps/ancam/.
John Wattie, "Anaglyphs for 3 dimensional viewing," http://nzphoto.tripod.com/sterea/anaglyphs.htm.

(Continued)

*Primary Examiner* — Richard Torrente
*Assistant Examiner* — Frank Huang
(74) *Attorney, Agent, or Firm* — Wong, Cabello, Lutsch, Rutherford & Brucculeri, LLP

(57) ABSTRACT

A digital camera for capturing stereoscopic images, including: an image sensor; an optical system; a user interface; a color image display; a data processing system; a buffer memory; a storage memory; and a program memory storing instructions configured to implement a method for capturing stereoscopic images. The method includes: capturing a first digital image of a scene in response to user activation of a user interface element; storing the first digital image; displaying a stream of stereoscopic preview images on the color image display, wherein the stereoscopic preview images are anaglyph stereoscopic images formed by combining the stored first digital image with a stream of evaluation digital images of the scene captured using the image sensor; capturing a second digital image of the scene in response to user activation of a user interface element; and storing a stereoscopic image based on the first digital image and the second digital image.

21 Claims, 7 Drawing Sheets

(56) References Cited

OTHER PUBLICATIONS

Consumer & Imaging Products Association, "Multi-Picture Format," CIPA White Paper DC-X007-2009, http://www.cipa.jp/english/hyoujunka/kikaku/pdf/DC-X007-KEY_E.pdf.

International Search Report and Written Opinion received in corresponding PCT Application No. PCT/US2012/037257, dated Jul. 4, 2012.

* cited by examiner

STEREOSCOPIC CAMERA USING ANAGLYPHIC DISPLAY DURING CAPTURE

FIELD OF THE INVENTION

This invention pertains to the field of digital cameras, and more particularly to a digital camera which captures stereoscopic images.

BACKGROUND OF THE INVENTION

Digital cameras are primarily designed for use in creating two-dimensional images. In a two-dimensional image, only one perspective is needed. Human vision, however, views scenes from two perspectives, with one perspective provided by each eye of an observer. The parallax that exists between the perspectives is interpreted by the mind of the observer to provide depth information about the scene being viewed. Various electronic and photochemical imaging techniques have been developed that capture images of a scene taken from different perspectives in order to provide three-dimensional (3-D) images. These images are processed and displayed to a user so that one eye of an observer views an image of the scene from one perspective while the other eye of the observer views another image of the scene taken from another perspective. This creates the parallax difference necessary to produce the appearance of depth in the mind of the observer. This is known as "stereoscopic photography" or "3-D photography."

3-D images can be captured using a digital camera having multiple image sensors, such as the FinePix REAL 3D W1 digital camera available from Fujifilm Corporation of Tokyo, Japan. Such cameras are relatively expensive, however, since they typically require at least two camera lenses, image sensors, and image processors.

To reduce cost, it is known to use a camera that provides a single optical path that is moved along a fixed track, as described in U.S. Pat. No. 5,883,695 to Paul, entitled "Method and Apparatus for Producing Stereoscopic Images with Single Sensor," and also U.S. Pat. No. 5,325,193 to Pritchard et al., entitled "Single Camera Autostereoscopic Imaging System." In such systems, different perspectives are captured as the camera is moved to fixed locations along the path.

In all 3-D imaging systems, the apparent depth in the scene is proportional to the extent of the parallax-induced differences between the positions of corresponding features in the presented images. The extent of such parallax-induced position differences is determined in part by the degree of separation between the captured images and in part by the distance from the captured images to the scene. Typically, 3-D imaging systems combine images that are captured at generally the same distance from the scene. This simulates the way that the eyes of a human observer will see a scene. Accordingly, the apparent extent of depth in the resultant output is typically modified by varying the degree of separation between the camera positions for the captured images. This creates an important issue for a photographer in preparing a multi-perspective image: the challenge of selecting the proper combination of camera positions necessary to provide a desired depth effect.

It is desirable to provide the photographer greater control in selecting the extent of separation between camera positions, and therefore the extent of the apparent depth in an image. This control can be provided by allowing the photographer to selectively position the camera to take individual images of the same scene from selected perspectives. These images are later reassembled to form a multi-perspective image. One difficulty in using systems and methods of this type is that it is often difficult for the photographer to know at the time of capture what effect the combination of the images captured at the different camera positions will achieve when they are eventually rendered.

However, in giving the photographer greater control, it is important to provide the photographer with the ability to predict how the resultant multi-perspective image will appear when rendered. Cameras that provide a verification system of individual images captured by a camera do not solve this problem because they are typically adapted to show only one captured image at a time.

It is known to provide a downloadable software application, or "APP" for a smart phone, such as an Apple iPhone that displays previously captured 3-D images using an anaglyphic display method. For example, the "Anaglyph Camera" software application by Nigel Crawley Software enables a user to display two different images of a subject, captured using their iPhone's camera, as an anaglyph image. Anaglyph images are designed to be viewed by a user wearing special 3-D anaglyph glasses having different colored filters for the two eyes (e/g/. a red filter for the left eye and a cyan filter for the right eye). After capturing the images, the user puts on a pair of 3-D anaglyph glasses to view an automatically generated anaglyph, which provides a 3-D effect. The user can then save this 3-D anaglyph image to the photo library on their iPhone, for later viewing. However, this does not enable the user to view a 3-D image during capture, since the glasses are not used until after both images are captured. As a result, it is difficult for the user to capture an image with the desired 3-D effect.

It is known to provide a digital camera using a single image sensor and two separate electronic viewfinders, one for each eye, as described in commonly-assigned U.S. Pat. No. 7,466,336 to Regan et al., entitled "Camera and method for composing multi-perspective images," which is incorporated herein by reference. A first image is captured, and displayed on one of the electronic viewfinders as a "frozen" image. Next, the user moves the digital camera slightly to compose a second image, which is displayed as a preview image using the other electronic viewfinder. This enables the user to view the 3-D effect as the second image is composed. This approach requires two separate electronic viewfinders, which increases the size and cost of the camera.

There remains a need to provide a compact, low cost, 3-D digital camera that permits a photographer to see a preview or verification representation of a 3-D image during the image composition process.

SUMMARY OF THE INVENTION

The present invention represents a digital camera for capturing stereoscopic images, comprising:
  an image sensor for capturing a digital image;
  an optical system for forming an image of a scene onto the image sensor;
  a user interface having user interface elements;
  a color image display;
  a data processing system;
  a buffer memory;
  a storage memory for storing captured images; and
  a program memory communicatively connected to the data processing system and storing instructions configured to cause the data processing system to implement a method for capturing stereoscopic images, wherein the method includes:

selecting a stereoscopic image capture mode using the user interface elements;

capturing a first digital image of a scene using the image sensor in response to user activation of a user interface element;

storing the first digital image in the buffer memory;

displaying a stream of stereoscopic preview images on the color image display, wherein the stereoscopic preview images are anaglyph stereoscopic images formed by combining the stored first digital image with a stream of evaluation digital images of the scene captured using the image sensor;

capturing a second digital image of the scene in response to user activation of a user interface element; and storing a stereoscopic image based on the first digital image and the second digital image in the storage memory.

The present invention has the advantage that stereoscopic images having a preferred 3-D effect can be captured using a digital camera with a single image sensor and optical system. A stream of stereoscopic preview images are provided to aid in the image composition process in order to capture the stereoscopic image providing a preferred 3-D effect.

It has the additional advantage that the stereoscopic preview images are provided on a conventional color image display, without the need of any special 3-D display technology. The stereoscopic preview images are viewable with inexpensive, readily available anaglyph glasses.

It has the further advantage that the captured stereoscopic images can be reviewed by automatically forming anaglyph stereoscopic images for display on the image display.

Figure 1:
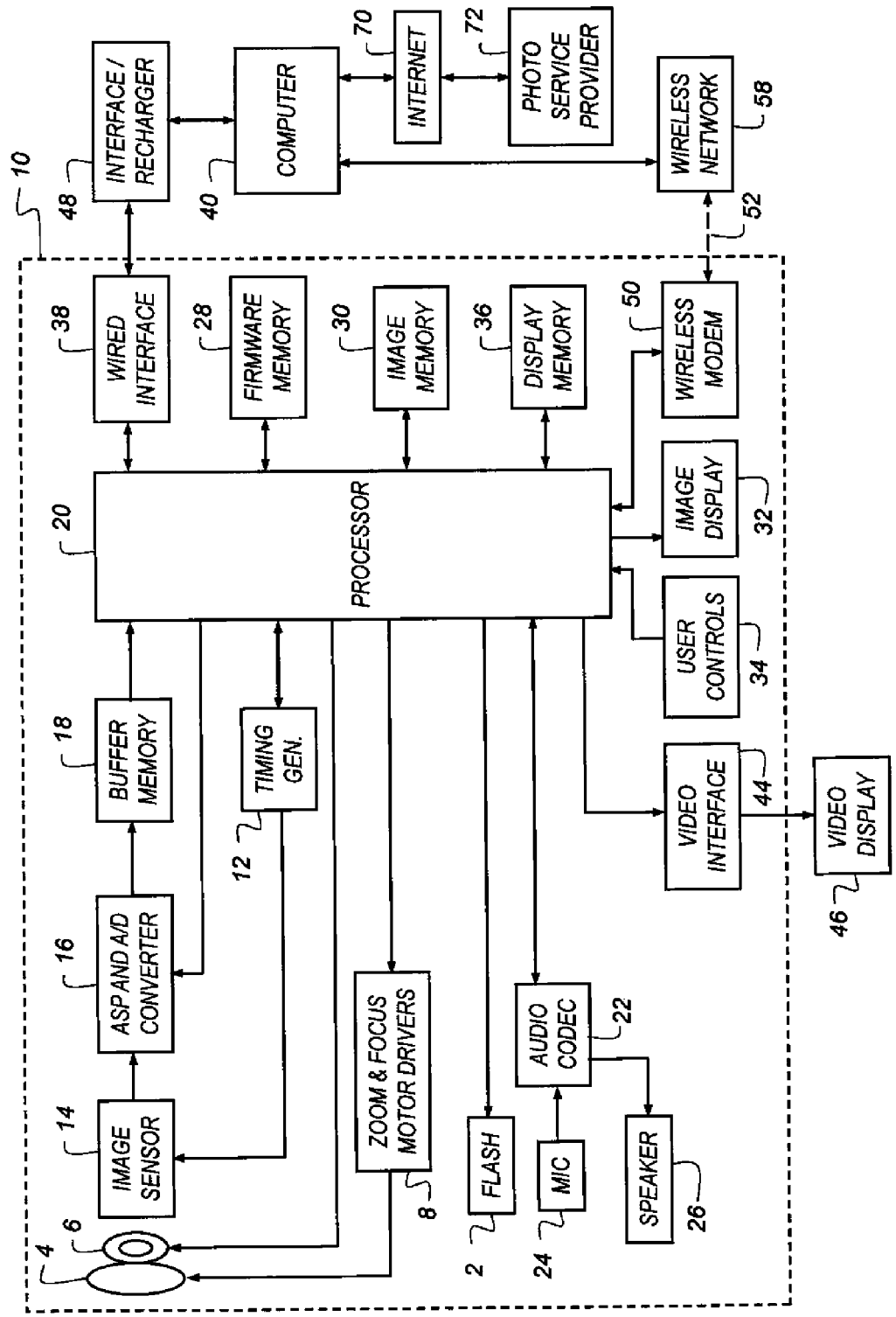
FIG. 1 is a high-level diagram showing the components of a digital camera system.

It is to be understood that the attached drawings are for purposes of illustrating the concepts of the invention and may not be to scale.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a non-transitory, tangible computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode sensor image data can be processed as described in commonly assigned U.S. Pat. No. 6,292,218 to Parulski, et al., entitled "Electronic camera for initiating capture of still images while previewing motion images," which is incorporated herein by reference. In the present invention, the preview mode sensor image data is used to create one of the two views used for the anaglyphic preview image, as will be described later in reference to FIG. 4.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

In accordance with the present invention, when the digital camera is operating in a stereoscopic image capture mode, the image display 32 is used to display a color anaglyph stereoscopic preview image during the image composition process while capturing the second image of a stereoscopic image pair. The image display 32 can also be used to display color anaglyph stereoscopic images of stored stereoscopic image pairs.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

An audio codec 22 connected to the processor 20 receives an audio signal from a microphone 24 and provides an audio signal to a speaker 26. These components can be used to record and playback an audio track, along with a video sequence or still image. If the digital camera 10 is a multifunction device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
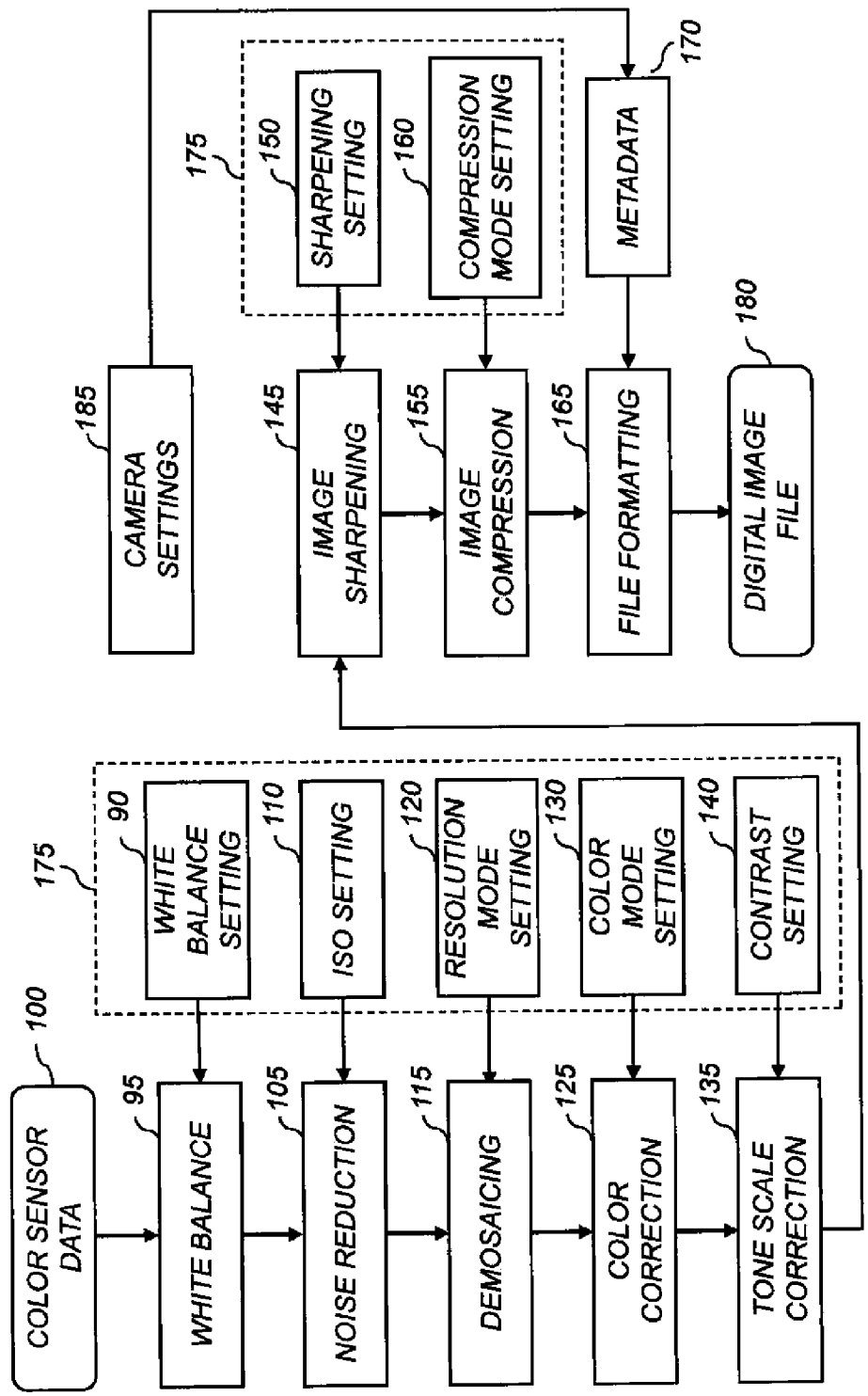
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

When the digital camera is set to operate in a stereoscopic image capture mode, the image processing operations depicted in FIG. 2 are used to first process a first captured digital image, and to then process a second captured digital image, in order to create a stereoscopic image. It will be understood that the processing depicted in FIG. 2 is used to provide a pair of stored digital images, which are typically full color images. The pair of full color images is then used to form color anaglyph stereoscopic images which can be displayed on the image display 32 of the digital camera 10.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference.

The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (Normal Color Reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \qquad (1)$$

Setting 2 (Saturated Color Reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \qquad (2)$$

Setting 3 (De-Saturated Color Reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \qquad (3)$$

Setting 4 (Monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \qquad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format.

In a preferred embodiment of the present invention, when the digital camera is operating in the stereoscopic image capture mode the metadata 170 includes information indicating whether the digital image file 180 is the first digital image or the second digital image of a stereoscopic image. In some embodiments, a single digital image file 180 can be used to store both the first digital image and the second digital image of the stereoscope image, as will be described later with respect to store stereoscopic image step 340 of FIG. 3.

The present invention will now be described with reference to FIG. 3, which shows a high-level flow diagram of a method for operating a digital camera having a stereoscopic image capture mode. It will be understood that the digital camera 10 (FIG. 1) can generally be used to capture both conventional 2-D images as well as 3-D stereoscopic images. In select stereoscopic image capture mode step 300, the processor 20 (FIG. 1) in the digital camera 10 responds to a user action enabled by user controls 34 (FIG. 1) in order to set the digital camera to operate in a stereoscopic image capture mode. Any type of user controls 34 known in the art can be used to select the stereoscopic image capture mode. For example, the user controls 34 can be used to initiate an image capture mode selection process. A menu of available image capture modes can then be displayed on the image display 32 (FIG. 1), and appropriate user controls 34 can be used to select the stereoscopic image capture mode.

In some embodiments, when the stereoscopic image capture mode is selected, the image display 32 is used to provide instructions to the user concerning how to capture stereoscopic images. In some embodiments, the user instructions are displayed for a predetermined time interval at one or more points in the process of capturing stereoscopic images. A first instruction to the user can be to put on a pair of anaglyphic glasses in order to enable the user to view 3-D images on the image display 32. In some embodiments, the user instructions can be overlaid on top of other displayed information (e.g., preview images), or can be displayed in a margin region on the edge of the image display 32. In some embodiments, the user instructions to the user can be displayed in 3-D such that different portions of the user instructions or other menu items are displayed at different depths.

In capture first digital image step 305, a first digital image 310 of a scene is captured using the image sensor 14 (FIG. 1) in response to user activation of a user control 34, such as image capture control 490 shown in FIG. 6A. In store first digital image step 315, the captured first digital image 310 is processed and stored in the image memory 30. In a preferred embodiment, the processing is performed as described earlier with reference to FIG. 2.

In display stereoscopic preview images step 320, the processor 20 in the digital camera 10 forms a stream of stereoscopic preview images 325 and displays them on the image display 32. In some embodiments, user instructions can also be displayed on the image display 32 (e.g., "shift camera to right while viewing 3-D image & capture second image"). In some embodiments, the user instructions can be displayed briefly for a predefined time interval before displaying the stereoscopic preview images 325. In other embodiments the user instructions can be displayed in a margin surrounding the stereoscopic preview images 325, or on a secondary display.

The stereoscopic preview images 325 are anaglyph stereoscopic images formed by combining the stored first digital image with a stream of evaluation images of the scene captured using the image sensor 14. Prior to capturing the first evaluation image, it will be understood that the stereoscopic preview images 325 can be initialized by using the first digital image 310 for both the left view image and the right view image when forming the anaglyph stereoscopic image.

Methods for forming anaglyph stereoscopic images from left view and right view digital images are well-known in the art. In a preferred embodiment, the anaglyph stereoscopic images are red-cyan anaglyph stereoscopic images intended to be viewed by an observer wearing anaglyph glasses providing a red filter over the viewer's left eye and a cyan filter over the viewer's right eye. It will be recognized that other forms of anaglyph stereoscopic images can also be used in accordance with the present invention (e.g., red-blue, red-green, magenta-green, yellow-blue or cyan-magenta anaglyph stereoscopic images). Generally, the two color filters used for the anaglyph glasses are complementary such that the wavelength band passed by one of the filters are substantially non-overlapping with the wavelength band passed by the other filter.

As is well-known in the art, a red-cyan anaglyph stereoscopic image can be formed by combining the red color channel of a left view digital image with the complementary green and blue color channels of a right view digital image. (Other forms of anaglyph stereoscopic images can similarly be made by combining different combinations of color channels.) In some embodiments, it may be desirable to apply a color transformation to transform the left and right view images to a color space with particular RGB primaries before performing the combining operation. The particular RGB primaries may be the primaries associated with the image display 32, or may be some other set of RGB primaries.

In one embodiment, the display stereoscopic preview images step 320 uses first digital image 310 for the left view digital image and the stream of evaluation images captured during the display stereoscopic preview images step 320 is used to provide a constantly changing right view digital image. Alternately, the first digital image 310 can be used for the right view digital image and the stream of evaluation images can be used for the left view digital image.

In capture second digital image step 330, the processor 20 in the digital camera 10 controls the capture of a second digital image 335 in response to user activation of an appropriate user control 34, such as the image capture control 490 shown in FIG. 6A.

In store stereoscopic image step 340, the processor 20 in the digital camera 10 stores a stereoscopic image 345 in image memory 30, which serves as a storage memory. The stereoscopic image 345 is formed using the first digital image 310 and the second digital image 335. The stereoscopic image 345 can be stored using any format known in the art for storing 3-D digital images. In some embodiments, the stereoscopic image 345 is stored in a pair of associated image files, wherein one image file stores the first digital image 310 and the second image file stores the second digital image 335. In alternative embodiments, the stereoscopic image 345 is stored in a single image file including both the first digital image 310 and the second digital image 335. This can be done, for example, using the Multi-Picture Format defined by the Consumer & Imaging Products Association (CIPA White Paper DC-X007-2009). In some embodiments, an anaglyph stereoscopic image formed using the first digital image 310 and the second digital image 335 can also be stored in the single image file, or in a separate image file. In other embodiments, the stereoscopic image 345 can be stored by storing only the anaglyph stereoscopic image as a 2-D digital image (e.g., in a standard JPEG file).

Figure 3:
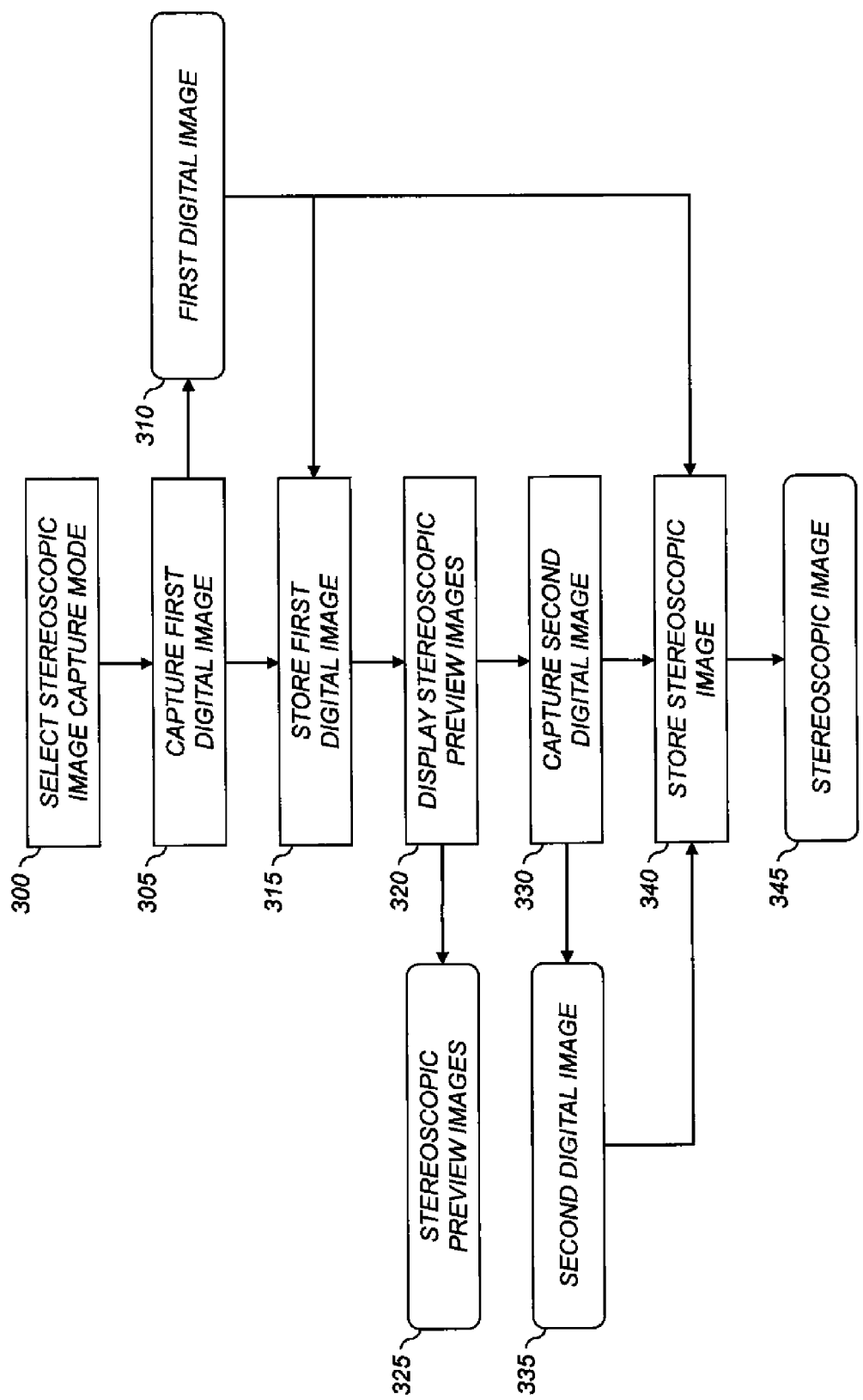
FIG. 3 is a flowchart showing steps for providing a digital camera for capturing stereoscopic images according to one embodiment of the present invention.
Figure 4A:
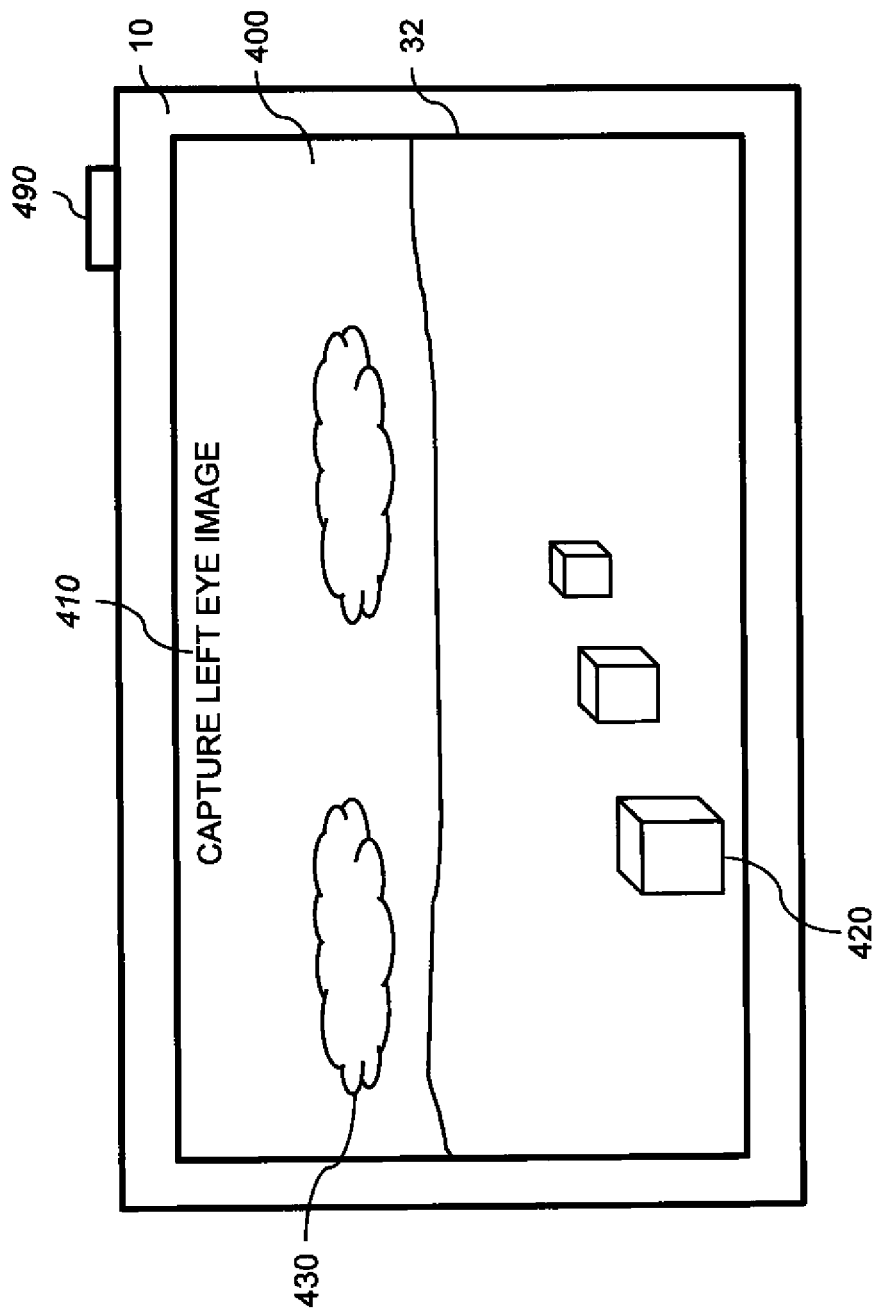
FIGS. 4A-4C depict preview images displayed on the image display of the digital camera during the process of capturing a stereoscopic image.
Figure 4B:
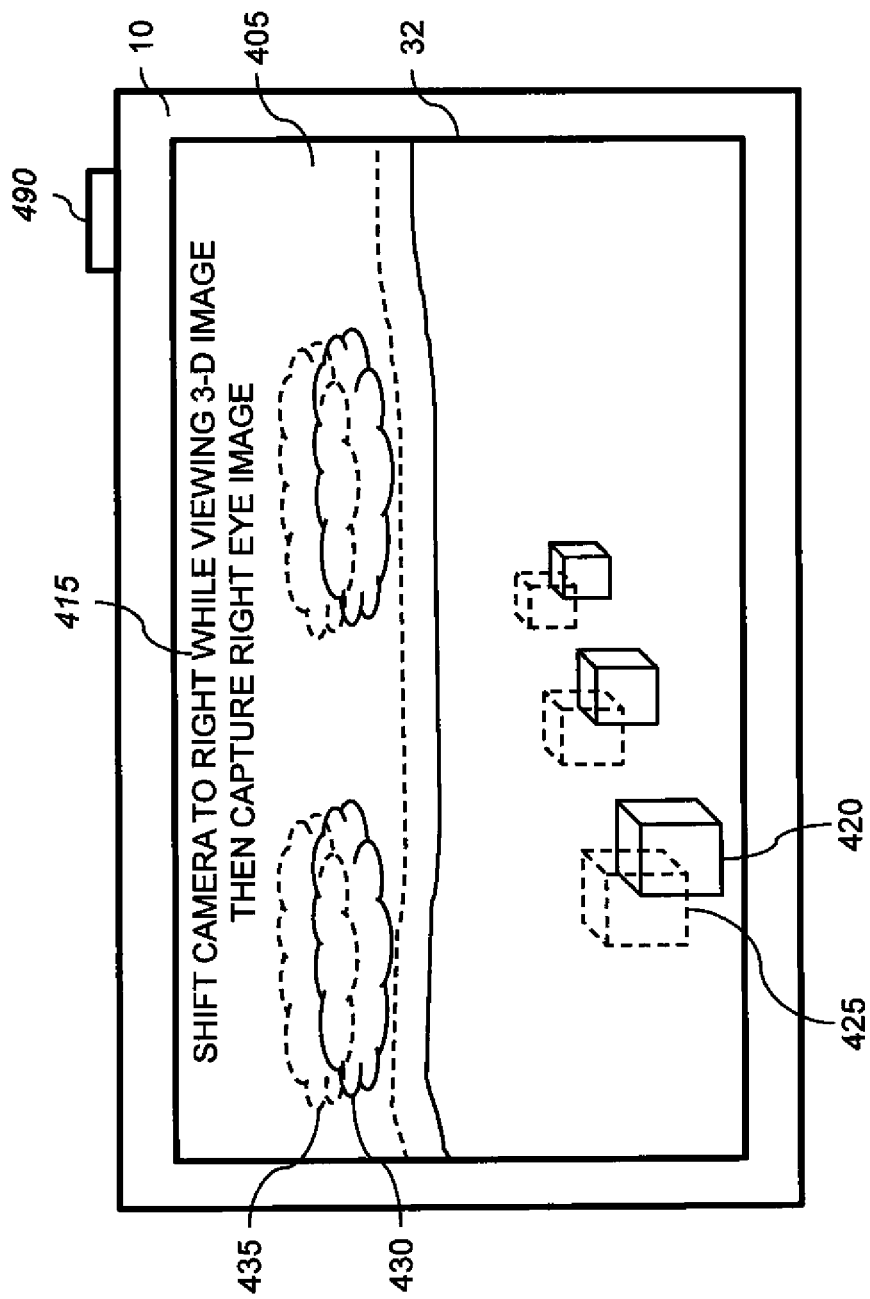
Figure 4C:
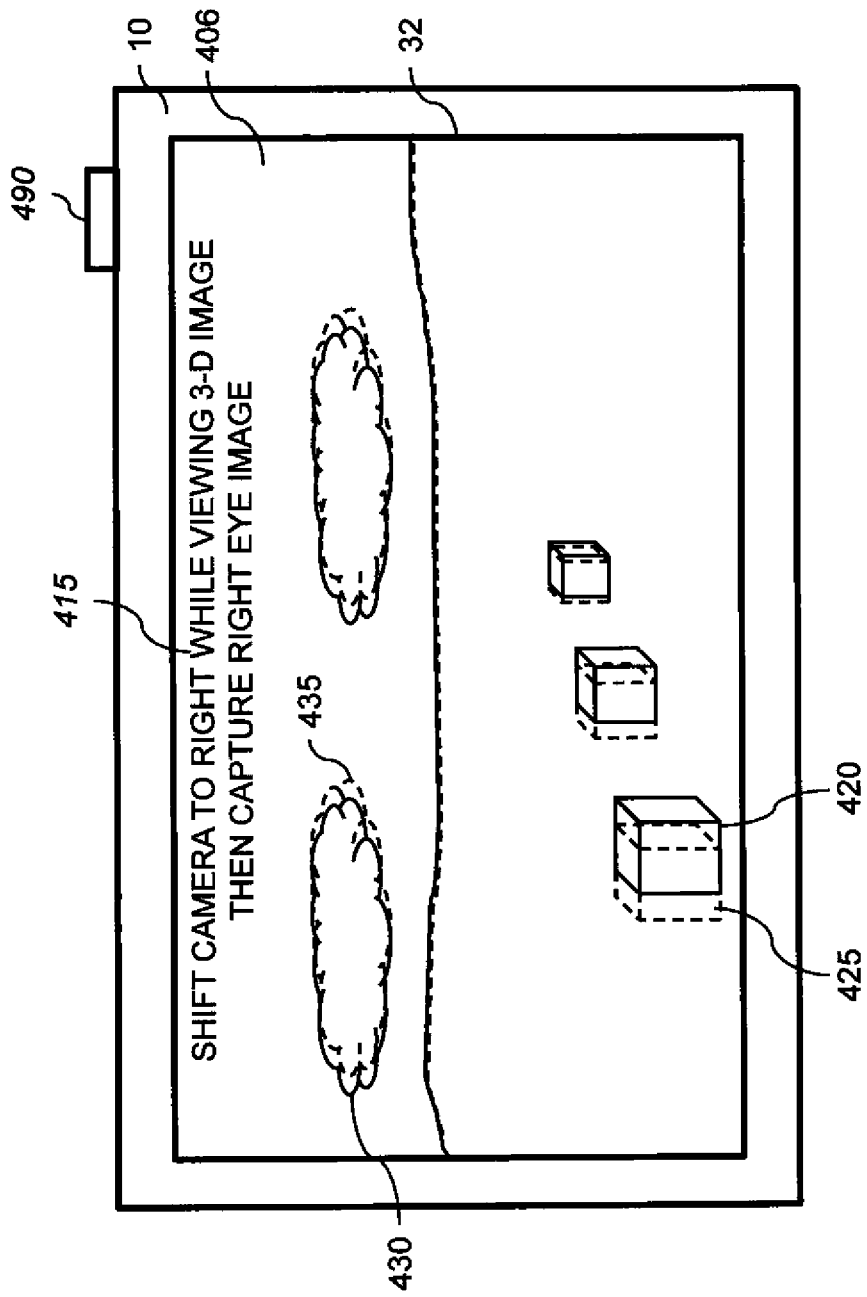

FIGS. 4A-C depict the process of capturing a stereoscopic image on digital camera 10 having image display 32. FIG. 4A shows an example of the user interface displayed on the image display 32 when the stereoscopic image capture mode is entered. A 2-D preview image 400 is displayed to enable the user to compose an image of the scene to be used for the first digital image 310. First image instructions 410 are overlaid on the 2-D preview image 400 instructing the user to "capture left eye image." In this example, the scene includes foreground objects 420 (cubes) and background objects 430 (clouds). When the user has composed the desired left eye image, the capture first digital image step 305 (FIG. 3) is initiated by pressing the image capture control 490 to capture the first digital image 310 (FIG. 3). In this example, the image capture control 490 is a shutter button. In alternate embodiments, the image capture control 490 can use other types of user controls 34 (FIG. 1). For example, in some embodiments the image display 32 is a touch-sensitive display, and the capture first digital image step 305 is initiated by touching an appropriate region on the image display 32, which serves as the image capture control 490.

After the first digital image 310 has been captured, the process proceeds to the display stereoscopic preview images step 320 (FIG. 3). FIG. 4B shows an example of the user interface displayed during this step. A stereoscopic preview image 405 is displayed on the image display 32, together with second image instructions 415 which instruct the user to "shift camera to right while viewing 3-D image then capture right view image."

The stereoscopic preview image 405 is an anaglyph stereoscopic image formed using the first digital image 310 as the left digital image and an evaluation image captured in real time using the image sensor 14 (FIG. 1) as the right digital image. The red channel of the stereoscopic preview image 405 is extracted from the first digital image 310 and shows the left eye positions of the foreground objects 420 and the background objects 430. The green and blue channels of the stereoscopic preview image 405 are extracted from the evaluation image and show the positions of shifted foreground objects 425 and shifted background objects 435. In this example, the shifted object positions are all to the left and above the corresponding object positions in the first digital image 310. If the stereoscopic preview image 405 is viewed without anaglyph glasses the content from the first digital image 310 will appear to be reddish, and the content from the evaluation images will appear to be cyanish. However, when the stereoscopic preview image 405 is viewed with anaglyph glasses, the viewer will see the appearance of a 3-D image.

The user can view the stereoscopic preview image 405 using anaglyph glasses to get a preview of the stereoscopic image. The user can then adjust the position and orientation of the digital camera 10, and the stereoscopic preview image 405 will update accordingly. The stereoscopic preview image 405 shown in FIG. 4B would generally not correspond to a high quality stereoscopic image for several reasons. First, the fact that the shifted object positions include a vertical shift is generally not desirable. Additionally, it is generally desirable to have the plane of zero disparity to be somewhere toward the center of the scene's depth range so that the shifted foreground objects 425 are to the left of the foreground objects 420, and the shifted background objects 435 are to the right of the background objects 430.

FIG. 4C shows an updated stereoscopic preview image 406 after the user has adjusted the image composition until the desired 3-D effect is obtained as evaluated by viewing the stereoscopic preview image 406 using anaglyph glasses. At this point, the user activates the image capture control 490 to initiate the capture second digital image step 330 (FIG. 3) and capture the second digital image 335 (FIG. 3). The store stereoscopic image step 340 (FIG. 3) is then executed to store the stereoscopic image 345 (FIG. 3) in the image memory 30 (FIG. 1)

Figure 5:
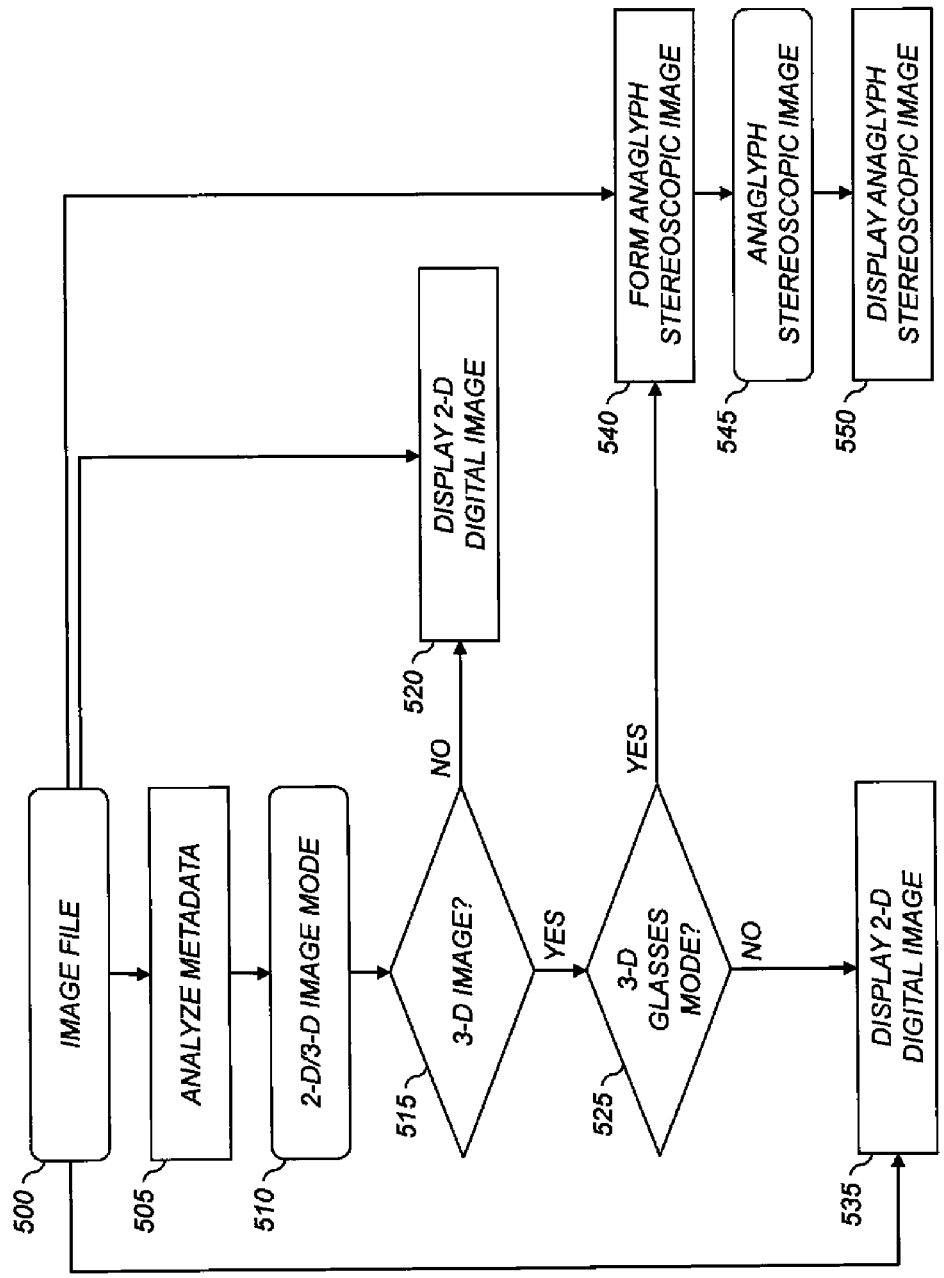
FIG. 5 is a flowchart showing steps for reviewing captured stereoscopic images according to one embodiment of the present invention.

In some embodiments, an optional 3-D image review mode can be provided to allow the user to review stored stereoscopic images 345 (FIG. 3). When stereoscopic images 345 are selected to be reviewed, anaglyph stereoscopic images are automatically formed for viewing using anaglyph glasses. FIG. 5 is a flowchart showing steps for reviewing digital images stored in the image memory 30 (FIG. 1) of the digital camera 10 (FIG. 1) in accordance with the present invention. When the users selects the image review mode, a user interface is provided to allow the user to select an image file 500 containing an image to be reviewed.

An analyze metadata step 505 is used to extract relevant metadata from the image file 500 and analyze it to determine a 2-D/3-D image mode 310. The 2-D/3-D image mode 510 provides an indication whether the image file 500 was captured using a 2-D image capture mode or a 3-D stereoscopic image capture mode. If the metadata in the selected image file 500 indicates that it contains either the left eye image or the right eye image from a stereoscopic image pair, the other associated image in the stereoscopic image pair can also be identified for use in forming the review image.

A 3-D image test 515 controls the behavior dependent on whether the image file 500 was captured in the 3-D stereoscopic image capture mode. If not, then the image file 500 contains a conventional 2-D image which is reviewed using a display 2-D digital image step 520.

In some embodiments, two different stereoscopic image review modes can be provided for reviewing stereoscopic images: one for reviewing 3-D stereoscopic images using anaglyph glasses, and an alternate mode for reviewing 3-D stereoscopic images when no anaglyph glasses are available. In a preferred embodiment, the desired stereoscopic image review mode can be selected with appropriate user controls 34 (FIG. 1). A 3-D glasses mode test 525 is used to control the behavior of the image review process depending on the selected stereoscopic image review mode.

If the 3-D glasses mode test 525 determines that the 3-D glasses mode is not selected, then the stereoscopic image is displayed in a manner that can be viewed without the user of 3-D glasses. In a preferred embodiment, a display 2-D digital image step 535 is used to display one of the digital images in the stereoscopic image pair. In this way the overall composition of the stereoscopic image can be reviewed, although the 3-D characteristics will not be visible. The displayed digital image can be either the first digital image 310 (FIG. 3) or the second digital image 335 (FIG. 3). In some embodiments, a user interface can be provided to enable the user to select which of the two digital images is displayed, or to toggle back and forth between them.

If the 3-D glasses mode test 525 determines that the 3-D glasses mode is selected, then a form anaglyph stereoscopic image step 540 is used to automatically form an anaglyph stereoscopic image 545 from the stereoscopic image stored in the image file 500. The anaglyph stereoscopic image 545 is formed using the process that was described earlier with reference to the display stereoscopic preview images step 320 (FIG. 3). A display anaglyph stereoscopic image step 550 is then used to display the anaglyph stereoscopic image 545 on the image display 32 (FIG. 1).

In some embodiments, if the user determines that the captured stereoscopic image 345 (FIG. 3) is not acceptable (for example by reviewing the stereoscopic image in the review mode) provision can be made to modify the stereoscopic image 345 by capturing a new digital image to replace either the first digital image 310 or the second digital image 335. A user interface can be provided to enable the user to select which of the digital images should be replaced, and instructions can then be provided to instruct the user to capture the new digital image by activating the image capture control 490. While composing the scene, the display stereoscopic preview images step 320 can be used to display a stream of stereoscopic preview images 325 that can be viewed by the user using anaglyph glasses as was described earlier. A modified stereoscopic image can then be formed by replacing the designated first digital image 310 or second digital image 335 with the new digital image. The modified stereoscopic image can then be stored using the store stereoscopic image step 340. This process can be repeated to capture additional digital images until the user is satisfied with the captured stereoscopic image 345.

In an alternate embodiment, the above-described method can be generalized to capture 3-D images including an image series having more than two digital images, each of the digital images being captured from different viewpoints. Such 3-D images are useful for various applications, such as 3-D displays that allow the user to adjust the direction from which the scene is viewed. In this case, for each successive image in the image series, the user can view a stream of stereoscopic preview images 325 formed by combining the most recently captured digital image with a stream of evaluation images of the scene captured using the image sensor. In this way, each digital image in the series is used as a reference image during the capture of the next digital image in the series. The number of digital images in the series can be pre-specified (e.g., using a settings menu), or alternately, an appropriate user interface element can be provided to enable the user to terminate the process when the desired number of additional digital images have been captured.

In some embodiments of the present invention, a software application ("APP") is supplied for use with a smart phone, such as an iPhone or an Android phone, having a digital camera and an image display. The APP provides software instructions that control the image capture, processing, storage, and display functions of the smart phone in order to provide the described functionality. In some embodiments, the APP can be downloaded onto the smart phone from a network server across a communications network, such as the wireless network 58 (FIG. 1).

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

| PARTS LIST | |
|---|---|
| 2 | flash |
| 4 | lens |
| 6 | adjustable aperture and adjustable shutter |
| 8 | zoom and focus motor drives |
| 10 | digital camera |
| 12 | timing generator |
| 14 | image sensor |
| 16 | ASP and A/D Converter |
| 18 | buffer memory |
| 20 | processor |
| 22 | audio codec |
| 24 | microphone |
| 26 | speaker |
| 28 | firmware memory |
| 30 | image memory |
| 32 | image display |
| 34 | user controls |
| 36 | display memory |
| 38 | wired interface |
| 40 | computer |
| 44 | video interface |
| 46 | video display |
| 48 | interface/recharger |
| 50 | wireless modem |
| 52 | radio frequency band |
| 58 | wireless network |
| 70 | Internet |
| 72 | photo service provider |
| 90 | white balance setting |
| 95 | white balance step |
| 100 | color sensor data |
| 105 | noise reduction step |
| 110 | ISO setting |
| 115 | demosaicing step |
| 120 | resolution mode setting |
| 125 | color correction step |
| 130 | color mode setting |
| 135 | tone scale correction step |
| 140 | contrast setting |
| 145 | image sharpening step |
| 150 | sharpening setting |
| 155 | image compression step |
| 160 | compression mode setting |
| 165 | file formatting step |
| 170 | metadata |
| 175 | user settings |
| 180 | digital image file |
| 185 | camera settings |
| 300 | select stereoscopic image capture mode step |
| 305 | capture first digital image step |
| 310 | first digital image |
| 315 | store first digital image step |
| 320 | display stereoscopic preview images step |
| 325 | stereoscopic preview images |
| 330 | capture second digital image step |
| 335 | second digital image |
| 340 | store stereoscopic image step |
| 345 | stereoscopic image |
| 400 | 2-D preview image |
| 405 | stereoscopic preview image |
| 406 | stereoscopic preview image |
| 410 | first image instructions |
| 415 | second image instructions |
| 420 | foreground objects |
| 425 | shifted foreground objects |
| 430 | background objects |
| 435 | shifted background objects |
| 490 | image capture control |
| 500 | image file |
| 505 | analyze metadata step |
| 510 | 2-D/3-D image mode |
| 515 | 3-D image test |
| 520 | display 2-D digital image step |
| 525 | 3-D glasses mode test |
| 535 | display 2-D digital image step |

-continued

| PARTS LIST | |
|---|---|
| 540 | form anaglyph stereoscopic image step |
| 545 | anaglyph stereoscopic image |
| 550 | display anaglyph stereoscopic image step |

The invention claimed is:

1. A digital camera for capturing stereoscopic images, comprising:
   an image sensor for capturing a digital image;
   an optical system for forming an image of a scene onto the image sensor;
   a user interface having user interface elements;
   a color image display;
   a data processing system;
   a buffer memory;
   a storage memory for storing captured images; and
   a program memory communicatively connected to the data processing system and storing instructions configured to cause the data processing system to:
      receive a selection of a stereoscopic image capture mode from the user interface elements;
      obtain a first digital image of a scene captured using the image sensor in response to a first activation of at least one of the user interface elements, the first digital image comprising foreground objects and background objects;
      store the first digital image in the buffer memory;
      display a real time stream of low resolution stereoscopic preview images on the color image display, wherein the stereoscopic preview images comprise anaglyph stereoscopic images formed by combining the stored first digital image with a stream of evaluation digital images of the scene captured using the image sensor, and wherein the evaluation digital images comprise shifted foreground objects and shifted background objects;
      update the stream in real time in response to movement of the digital camera;
      determine that a plane of zero disparity of the scene is located substantially at a center of a depth range of the scene, wherein the shifted foreground objects are to the left of the foreground objects, and wherein the shifted background objects are to the right of the background objects;
      obtain a second digital image of the scene captured using the image sensor in response to a second activation of at least one of the user interface elements, wherein the second digital image provides a desired depth effect; and
      store a high resolution stereoscopic image based on the first digital image and the second digital image in the storage memory.

2. The digital camera of claim 1 wherein the stream of stereoscopic preview images is configured to be viewed using anaglyph glasses having different colored filters for a user's left and right eyes.

3. The digital camera of claim 2 wherein the anaglyph glasses include a red filter for the user's left eye and a cyan filter for the user's right eye.

4. The digital camera of claim 1 further including a set of anaglyph glasses for viewing the stream of stereoscopic preview images.

5. The digital camera of claim 1 wherein the anaglyph stereoscopic images are formed by combining a red color channel from the first digital image with one or more of green and blue color channels from the evaluation digital images, or by combining a red color channel from the evaluation digital image with one or more of green and blue color channels from the first digital image.

6. The digital camera of claim 1 wherein the anaglyph stereoscopic images are formed by combining one or more color channels from the first digital image with one or more complementary color channels from the evaluation digital images.

7. The digital camera of claim 1 wherein the instructions further comprise instructions configured to cause the data processing system to display user instructions on the color image display to guide a user through capture of the stereoscopic image.

8. The digital camera of claim 7 wherein at least some of the user instructions are overlaid on the stereoscopic preview images.

9. The digital camera of claim 7 wherein at least some of the user instructions are displayed for a predetermined time interval at one or more points during capture of the stereoscopic image.

10. The digital camera of claim 1 wherein the stereoscopic image is stored in a pair of associated image files, wherein one image file stores the first digital image and the second image file stores the second digital image.

11. The digital camera of claim 1 wherein the stereoscopic image is stored in a single image file including both the first digital image and the second digital image.

12. The digital camera of claim 11 wherein the single image file further includes an anaglyph image.

13. The digital camera of claim 1 wherein the stereoscopic image is stored as an anaglyph image.

14. The digital camera of claim 1 wherein the instructions further comprise instructions configured to cause the data processing system to:
   obtain a third digital image of the scene captured using the image sensor in response to a third activation of at least one of the user interface elements;
   form a modified stereoscopic image by replacing either the first digital image or the second digital image with the third digital image; and
   store the modified stereoscopic image in the storage memory.

15. The digital camera of claim 14 wherein at least one of the stereoscopic preview images is an anaglyph stereoscopic image formed by combining the second digital image with a stream of evaluation digital images of the scene captured using the image sensor.

16. The digital camera of claim 1 wherein the instructions further comprise instructions configured to cause the data processing system to:
   obtain one or more additional digital images of the scene captured using the image sensor in response to a third activation of at least one of the user interface elements; and
   store the one or more additional digital images in the storage memory in association with the stored stereoscopic image.

17. The digital camera of claim 16 wherein, during performance of the instructions to obtain each additional image, a stream of stereoscopic preview images is displayed on the color image display, wherein the stereoscopic preview images are anaglyph stereoscopic images formed by combining a most recently captured digital image with a stream of evaluation images of the scene captured using the image sensor.

18. The digital camera of claim 1 wherein the instructions further comprise instructions configured to cause the data processing system to:
- form an anaglyph stereoscopic review image from the stored stereoscopic image; and
- display the anaglyph stereoscopic review image on the color image display.

19. A non-transitory computer program product for controlling a programmable digital camera to capture a stereoscopic image, the programmable digital camera including an image sensor, an optical system for forming an image of a scene onto the image sensor, a user interface having user interface elements, a color image display, a data processing system, a buffer memory, and a storage memory, comprising an executable software application for causing the data processing system to:
- obtain a first digital image of the scene captured using the image sensor in response to a first activation of at least one of the user interface elements, the first digital image comprising foreground objects and background objects;
- store the first digital image in the buffer memory;
- display a real time stream of stereoscopic preview images on the color image display, wherein the stereoscopic preview images comprise anaglyph stereoscopic images formed by combining the stored first digital image with a stream of evaluation digital images of the scene captured using the image sensor, and wherein the evaluation digital images comprise shifted foreground objects and shifted background objects;
- update the stream in real time in response to movement of the digital camera;
- determine that a plane of zero disparity of the scene is located substantially at a center of a depth range of the scene, wherein the shifted foreground objects are to the left of the foreground objects, and wherein the shifted background objects are to the right of the background objects;
- obtain a second digital image of the scene captured using the image sensor in response to a second activation of at least one of the user interface elements, wherein the second digital image provides a desired depth effect; and
- store a stereoscopic image in the storage memory, wherein the stereoscopic image is formed using the first digital image and the second digital image.

20. The non-transitory computer program product of claim 19, wherein the programmable digital camera is a smart phone.

21. The non-transitory computer program product of claim 19, wherein the executable software application is downloaded to the programmable digital camera over a communications network.

* * * * *

UNITED STATES PATENT AND TRADEMARK OFFICE
CERTIFICATE OF CORRECTION

PATENT NO. : 8,780,180 B2  Page 1 of 1
APPLICATION NO. : 13/106952
DATED : July 15, 2014
INVENTOR(S) : Kenneth Alan Parulski It is certified that error appears in the above-identified patent and that said Letters Patent is hereby corrected as shown below:

In the Claims

Column 19, line 4 (Claim 18, line 4), replace the word "review" with the word --preview--.

Column 19, line 6 (Claim 18, line 6), replace the word "review" with the word --preview--.

Signed and Sealed this
Sixteenth Day of September, 2014

Michelle K. Lee
*Deputy Director of the United States Patent and Trademark Office*